April 21, 1936.  T. W. THIRLWELL  2,038,456
DIRECTION INDICATOR SWITCH
Filed Feb. 11, 1935  2 Sheets-Sheet 1
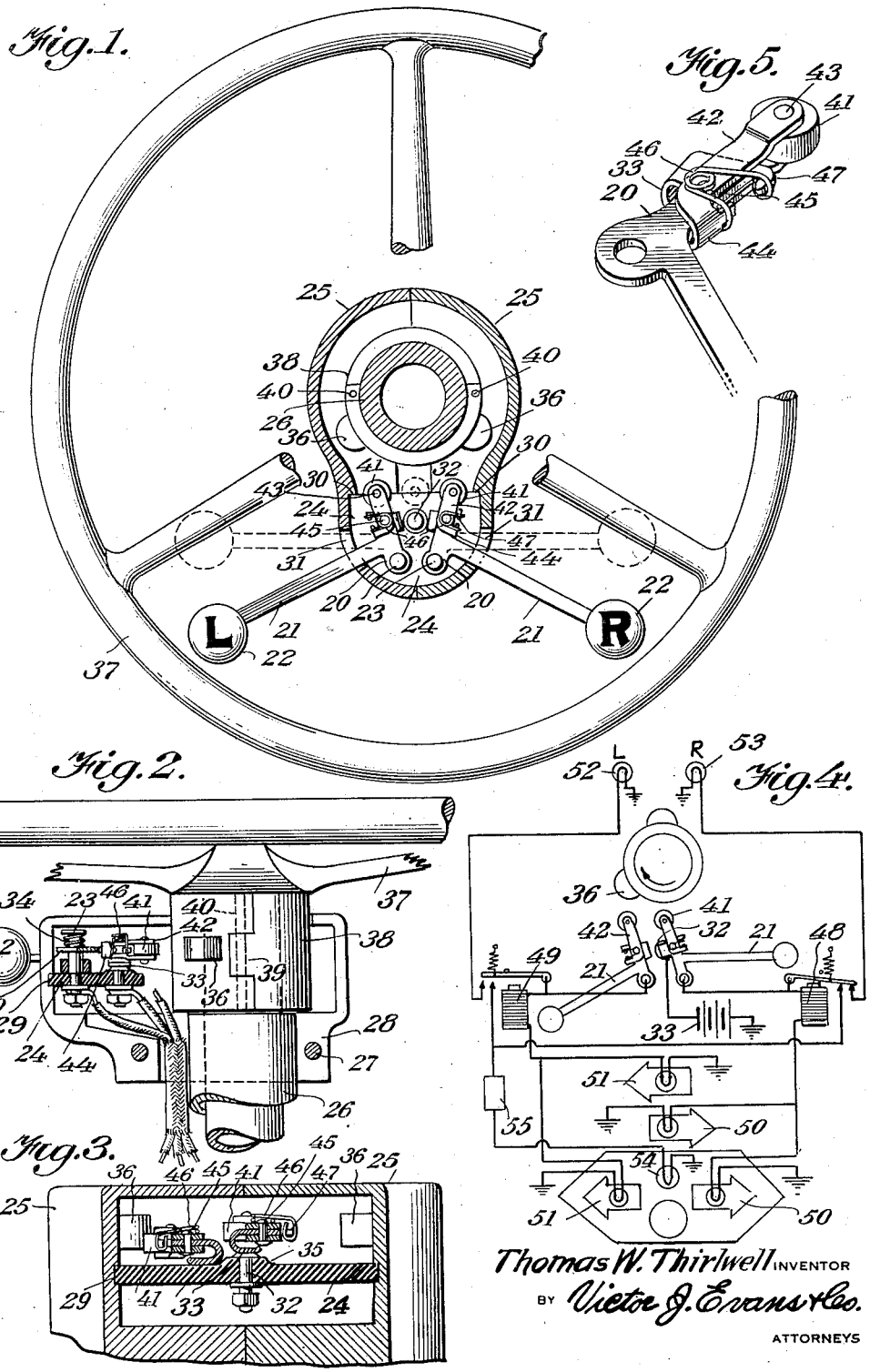
Thomas W. Thirlwell INVENTOR
BY Victor J. Evans & Co.
ATTORNEYS April 21, 1936.  T. W. THIRLWELL  2,038,456
DIRECTION INDICATOR SWITCH
Filed Feb. 11, 1935  2 Sheets-Sheet 2
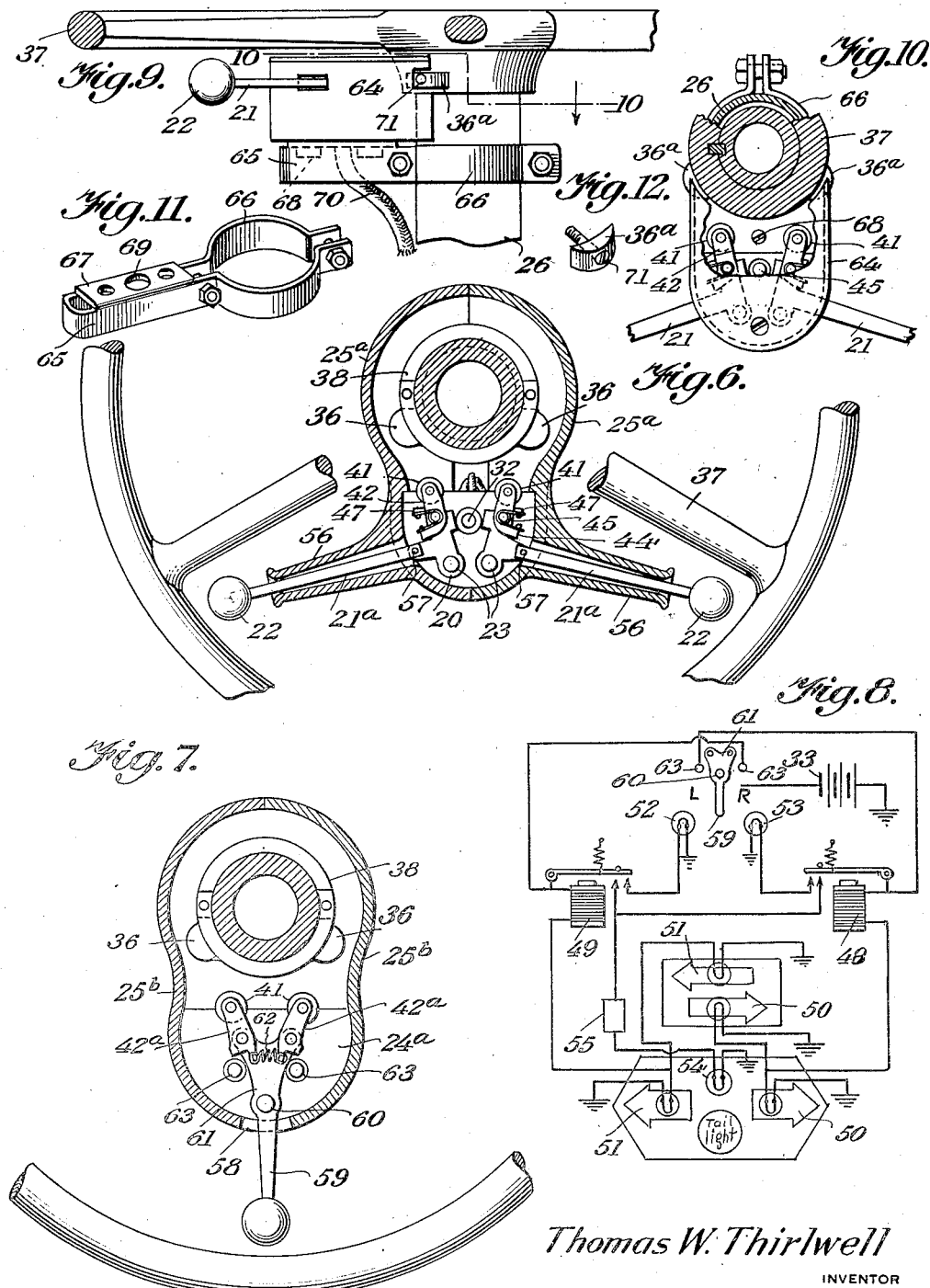
Thomas W. Thirlwell
INVENTOR
BY Victor J. Evans & Co.
ATTORNEYS Patented Apr. 21, 1936

2,038,456

UNITED STATES PATENT OFFICE 2,038,456

DIRECTION INDICATOR SWITCH

Thomas W. Thirlwell, St. Albans, W. Va.

Application February 11, 1935, Serial No. 6,067

2 Claims. (Cl. 200—59)

The object of the invention is to provide a direction indicator switch for use in connection with the direction indicators of motor vehicles and so constructed as to readily permit its incorporation as a part of the vehicle equipment at a point most convenient for the operator, so that his desired course may be indicated with facility; to provide a switch of the kind indicated which, after being operated to energize a signal, will be automatically returned to its inoperative position on the accomplishment of the turn effected by the vehicle; and to provide a switch of the kind which is of simple form, composed of but few parts, unlikely to be disarranged under the most exacting conditions of operation, and susceptible of cheap manufacture.

With this object in view, the invention consists in a construction and combination of parts, of which a preferred embodiment is illustrated in the accompanying drawings, wherein:

Figure 1 is a view partly in plan and partly in section illustrating a switch constructed in accordance with the invention and the manner of mounting the same.

Figure 2 is a side elevational view of the structure of Figure 1 with one side of the switch casing removed.

Figure 3 is a central vertical sectional view on the plane of the division line of the switch casing, showing one of the switch members in operative or circuit closing position.

Figure 4 is a diagrammatic view of the signal system of a motor vehicle with the improved switch included as an element thereof.

Figure 5 is a perspective view of the movable circuit closing element.

Figure 6 is a view similar to Figure 1 but illustrating a modified form of switch.

Figure 7 is also a view similar to Figure 1 but illustrating still another modification.

Figure 8 is a diagrammatic view of a vehicle signaling system in which the switch of Figure 7 is included as the actuating element.

Figure 9 is a side elevational view of still another modified form together with a mounting bracket for the same by which it may be attached to a conventional steering column.

Figure 10 is a sectional view on the plane indicated by the line 10—10 of Figure 9.

Figure 11 is a perspective view of the mounting bracket employed in that form of the invention shown in Figure 9.

Figure 12 is a perspective view of a modified form of kick-off cam.

The invention is susceptible of embodiment in any one of several forms, of which that shown in Figure 1 comprises rockable members 20 formed with angularly disposed lateral extensions 21 which constitute handles and which terminate preferably in heads 22 of spherical form, which are suitably indited L or R according as each is the head or terminal of the right-hand or left-hand member.

The rockable members are pivoted, as at 23, on a disk 24 of insulating material which is housed in a case composed of the complemental members 25 so formed that they may be disposed in surrounding relation to the steering column 26 and secured thereto when the fasteners 27 are attached, these fasteners passing through flange portions 28 with which the case sections are formed.

The disk 24 is retained in position in the sections 25 when the latter are connected by reason of being engaged in a slot 29 formed in the two sections and abutting shoulders 30 formed at the ends of the slot.

The sections 25 are formed with clearance slots 31 to provide for movement of the handles 21 in shifting the rockable members to and from circuit closing position.

The disk 24 carries a center contact 32 to which the positive lead of the battery 33 is connected and either one or the other of the rockable members is swung into engagement with this contact to close the circuit on the right-hand or left-hand signals.

The rockable members 20 are made preferably of flat stock and each is formed with a lateral extension which is turned under to provide a movable contact 33. The movable contact on each rockable member is yieldingly impelled into superficial contact with the top of the disk 24 by means of a compression spring 34 which is mounted on each pivot stud 23 and bears on the upper face of its attendant rockable member. Thus the rockable member, when its handle is swung, slides across the face of the disk and rides up onto the center contact. When the handle of the rockable member is in the rear end of the slot, the contact 33 is at the periphery of a central boss 35 formed on the disk 24, the contact 32 being centrally disposed on the boss.

The rockable members are manually moved into circuit closing position by actuation of their handles, but they are automatically returned to circuit opening position and this is accomplished by means of kick-off cams 36 which are designed to be carried by a steering wheel 37. In the illustrated form of the invention, the kick-off cams are formed as projections on a two-part collar 38, of which the complemental sections are formed with intercurrent tongues 39 through which are passed pins 40. The collar is disposed in surrounding relation to the hub of the steering wheel and is retained in position thereon when the pins 40 are inserted through the tongues.

In order that the kick-off cams may function, the rockable members 20 carry cam rollers 41 which, aside from rotating on their own axes, are also mounted for bodily swinging movement because of being carried by pivotally mounted arms, each of which is stamped from flat stock to provide arm sections 42 disposed above and below the roller 41 and carrying the pivot stud 43 on which the roller is mounted. The arm sections are interconnected by a web portion 44 remotely disposed from the roller, but abutting the edge of the rockable member adjacent its line of juncture with the handle 21. The arm is pivotally mounted on the rockable member by means of the stud 45 which passes through the two arm sections and through the rockable member, the arm sections being disposed above and below the latter. A coil spring 46, having one terminal connected with the web portion 44 and the other with an extension 47 on the rockable member, yieldingly retains the roller carrying arm with its web portion in engagement with the rockable member. By means of this construction, swinging movement of the roller carrying arm with respect to the rockable member is permitted in one direction, but precluded in the other direction. This, so that a rockable member having once been moved into circuit closing position may not be kicked off from such position by cam movement when the steering wheel is turning in the direction indicated by the circuit closing operation. If the right rockable member be moved into circuit closing position and the steering wheel turned righthandedly, the right-hand kick-off cam, while it will engage the roller 41, will not kick the rockable member from circuit closing position, since cam movement is in a direction in which the roller carrying arm may yield. When the steering wheel is being returned, however, the cam will engage the roller 41 from the opposite side, when there can be no relative movement of the roller carrying arm and rockable member, thus resulting in swinging the rockable member in circuit opening position.

The L and R rockable members are electrically connected respectively with the right and left relays 48 and 49, whose magnets are in series with the right and left signaling lights 50 and 51, there being two of each such signaling lights positioned respectively at the forward and rear of the vehicle, the forward and rear corresponding lights being connected in parallel. The armatures of the relays 49 respectively control the circuits of the left and right proving lights 52 and 53 and likewise control the stop light 54 which is in series with a flasher 55. The stop light 54 is controlled by the armature of either of the relays, so that when either one is actuated, the stop light will be flashed at the time either of the different signals is given. If any of the signaling lights burn out or fail to operate, the current in the magnets of the relays will thereby be cut down and their armatures will fail to operate, so that the effect will be indicated in the proving lights.

In that form of the invention shown in Figure 6, the construction is substantially the same as the form shown in Figure 1, but the manner of operation of the rockable members differs in that they are moved to circuit closing position by imparting an axial movement to the arms 21a as distinguished from the swinging movement imparted to the arms 21. The casing in this modified form, instead of being provided with the clearance slots 30, has the complemental sections 25a formed with laterally extending guide sleeves 56 in which the arms 21a are slidably mounted, but pivotally connected, as at 57, at their inner ends to the rockable members. An inward push on either arm effects the circuit closing position of its attendant rockable member, the circuit opening position being accomplished by the kick-off cam 36, just as in that form of the invention shown in Figure 1.

In the modification of the invention shown in Figure 7, the sections 25b of the casing omit the clearance slots 31 but instead are formed jointly at the rear with a slot 58 through which the switch arm 59 projects, this arm being swingable to the right or left to effect circuit closing position on either the right of left signal lights. In this form of the invention, the positive lead of the battery 33 is connected to the pivot stud 60 on which the substantially triangular rockable member 61 is mounted, the handle or lever 59 being an integral part of the rockable member. The opposite corners of the triangular rockable member 61 carry pivotally mounted arms 42a substantially identical in construction with the corresponding arms illustrated in Figures 1 and 6. A single spring 62 is tensioned by the tail hooks on the two arms 42a to swing them away from each other and bring the web sections into engagement with the edges of the triangular rockable member 61. The plate or disk 24a carries two contacts 63 with one of which the rockable member engages when swung in one direction and with the other of which it engages when swung in the other direction.

In connecting this form of the invention in circuit, the same system is followed as with the form shown in Figures 1 and 6, with the exception that the battery connection is made to the rockable member and the right and left signal lights respectively to the right and left fixed contacts 63. In circuit closing position, the rockable member is kicked off into neutral position by one or the other kick-off cams 36.

In that modification shown in Figures 9 to 12, substantially the same construction as employed in Figure 1 is used, with the exception that the case 64 is not of the two-part form, being a separate case adapted for mounting on the bracket 65, which is formed with a diametrically contractile clamp ring 66 for mounting on the steering column 26. The arm portion of the bracket is formed with a web 67 provided with holes by means of which bolts 68 are employed to secure the casing to the bracket, a central hole 69 being provided to admit the conductor cable 70 to the interior of the case.

The kick-off cams 36a, in this form, are secured directly to the hub by means of screws 71, rather than being carried by a collar attachable to the hub as in the forms shown in the remaining figures of the drawings.

The invention having been described, what is claimed as new and useful is:

1. A switch for direction indicators comprising in combination with the steering wheel of a motor vehicle and a kick-off cam carried thereby, a contact having means for supporting it stationarily with respect to the steering column of the vehicle, and a rockable member manually movable into engagement with said contact and disengaged therefrom by said kick-off cam, the rockable member having a contact engaging element and a swingingly mounted arm composed of corresponding arm sections disposed above and below the rockable member and interconnected by a web portion abutting the rockable member on the edge, a roller pivotally mounted between the extremities of the arm sections and a spring yieldingly impelling the arm in a direction to engage said web portion with the edge of said rockable member.

2. A switch for direction indicators comprising in combination with the steering wheel of a motor vehicle and a kick-off cam carried thereby, a contact having means for supporting it stationarily with respect to the steering column of the vehicle, and a rockable member manually movable into engagement with said contact and disengaged therefrom by said kick-off cam, the rockable member having a lateral extension turned under to provide a contact engaging element and also having a pivotally mounted arm composed of corresponding arm sections disposed above and below the rockable member and interconnected by a web portion crossing the edge of the rockable member, a roller mounted between the extremities of the arm sections, and a coil spring having one terminal connected with said web portion and the other terminal with an extension of the rockable member to yieldingly impel the web portion against the edge of the rockable member.

THOMAS W. THIRLWELL.